US009247148B2

(12) United States Patent
Okamoto

(10) Patent No.: US 9,247,148 B2
(45) Date of Patent: Jan. 26, 2016

(54) VARIABLE-MAGNIFICATION IMAGE PROCESSING APPARATUS

(71) Applicant: RICOH IMAGING COMPANY, LTD., Tokyo (JP)

(72) Inventor: Teppei Okamoto, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/497,786

(22) Filed: Sep. 26, 2014

(65) Prior Publication Data

US 2015/0092082 A1 Apr. 2, 2015

(30) Foreign Application Priority Data

Oct. 1, 2013 (JP) ................................. 2013-206832

(51) Int. Cl.
H04N 5/232 (2006.01)
H04N 5/345 (2011.01)
H04N 5/262 (2006.01)

(52) U.S. Cl.
CPC ....... *H04N 5/23296* (2013.01); *H04N 5/23293* (2013.01); *H04N 5/2628* (2013.01); *H04N 5/3454* (2013.01)

(58) Field of Classification Search
CPC .............. H04N 5/2628; H04N 5/3454; H04N 5/23296; H04N 5/23293; H04N 5/232; H04N 5/235
USPC ........... 348/63, 208.6, 240.1, 240.2, 345, 358
See application file for complete search history.

(56) References Cited

U.S. PATENT DOCUMENTS

| 7,250,968 | B2 * | 7/2007 | Ito | H04N 5/23209 348/240.2 |
| 7,450,155 | B2 * | 11/2008 | Nakanishi | H04N 5/23248 348/208.5 |
| 8,081,252 | B2 * | 12/2011 | Furuya | H04N 5/772 348/333.12 |
| 8,284,273 | B2 * | 10/2012 | Maeda | H04N 5/232 348/240.1 |
| 8,421,887 | B2 * | 4/2013 | Yokohata | G02B 7/102 348/240.1 |
| 2005/0104994 | A1 * | 5/2005 | Morimoto | H04N 5/23296 348/345 |
| 2008/0297625 | A1 * | 12/2008 | Santo | G03B 13/02 348/239 |

FOREIGN PATENT DOCUMENTS

| JP | HEI-10-326169 | 12/1998 |
| JP | 2007-174693 | 7/2007 |
| JP | 2008-070645 | 3/2008 |

* cited by examiner

Primary Examiner — Hung Lam
(74) Attorney, Agent, or Firm — Frommer Lawrence & Haug LLP

(57) ABSTRACT

A variable-magnification image processing apparatus, comprising: a magnification setting group storing unit to store a magnification setting group; a display magnification obtaining unit to obtain a display magnification of an image displayed on a display screen at an equal pixel magnification; a magnification setting selection unit configured to select one of the magnification settings in one of decreasing order and increasing order; and a display control unit configured to display the image at the magnification setting, wherein the magnification setting selection unit is configured to execute at least one of: operation to select the obtained display magnification subsequently to a maximum one of the magnification settings smaller than the obtained display magnification when a magnifying operation is conducted; and operation to select the obtained displaying magnification subsequently to a minimum one of the magnification settings larger than the obtained display magnification when a reducing operation is conducted.

14 Claims, 8 Drawing Sheets

VARIABLE-MAGNIFICATION IMAGE PROCESSING APPARATUS

BACKGROUND OF THE INVENTION

The present invention relates to a variable-magnification image processing apparatus capable of changing magnification of an image to be displayed on a display screen.

A technique where an image is displayed on a display screen of a display device, such as a liquid crystal display monitor, in an equal pixel magnification display style to enable a user to check, for example, a focus state of the image is known. The term "equal pixel magnification display style" means that an image is displayed on a display screen in such a manner that pixels of the image have a one-to-one relationship with pixels of the display screen, without converting each pixel value of the image to an approximate value. Japanese Patent Provisional Publication No. 2007-174693A (hereafter, referred to as a "patent document 1") describes an example of an apparatus capable of displaying a picked up image in the equal pixel magnification display style.

When the apparatus described in patent document 1 is set to a focus checking mode, the display magnification of an image on an image display unit is defined such that the display magnification can be changed in a range from a magnification where an image having a maximum pixel number is displayed approximately in the equal pixel magnification style to a magnification where an image having a minimum pixel number is displayed approximately in the equal pixel magnification style.

SUMMARY OF THE INVENTION

However, regarding the apparatus described in patent document 1, when a user wants to check composition of an image, the user needs to operate the apparatus to release the focus checking mode and then to conduct a magnifying operation or a reducing operation for display magnification. On the other hand, when the user wants to check a focus state of the image, the user needs to operate the apparatus to change to the focus checking mode and then to change the display magnification to a desirable magnification such as the equal pixel magnification.

As described above, regarding the apparatus described in patent document 1, the user is required to operate the apparatus for changing the display mode or the like each time the user conducts checking of composition or a focus state, which causes a problem regarding operability of the apparatus.

The present invention is advantageous in that it provides a variable-magnification image processing apparatus capable of enhancing operability when a user checks composition or a focus state of a picked up image.

According to an aspect of the invention, there is provided a variable-magnification image processing apparatus, comprising: a magnification setting group storing unit configured to store a magnification setting group including two or more predetermined discrete magnification settings, the magnification setting group being defined such that the magnification settings are selectable in one of decreasing order and increasing order; a display magnification obtaining unit configured to obtain a display magnification of an image defined when the image is displayed on a display screen having a predetermined pixel number in such a manner that pixels of the image have a one-to-one relationship with pixels of the display screen; a magnification setting selection unit configured to select one of the magnification settings in the magnification setting group in one of decreasing order and increasing order in accordance with a predetermined user operation; and a display control unit configured to display the image at the magnification setting selected by the magnification setting selection unit. In this configuration, the magnification setting selection unit is configured to execute at least one of: operation to select the obtained display magnification obtained by the display magnification obtaining unit subsequently to a maximum one of the magnification settings which are smaller than the obtained display magnification when a magnifying operation for display magnification is conducted; and operation to select the obtained displaying magnification subsequently to a minimum one of the magnification settings which are larger than the obtained display magnification when a reducing operation for display magnification is conducted.

With this configuration, the user is able to check the image of which magnification is changed for checking composition and the image displayed at the equal pixel magnification for checking a focus state, without conducting a complicated user operation for switching the display mode or the like, while conducting the same image magnifying operation or the same image reducing operation as that of a conventional user operation. Since the conventional user operation is maintained and thereby a complicated user operation such as a switching operation for the displaying mode is not required, the operability when the user checks composition or a focus state is enhanced.

The variable-magnification image processing apparatus may further comprise an informing unit configured to inform a user of a fact that a current magnification of the image corresponds to a magnification where pixels of the image have the one-to-one relationship with pixels of the display screen when the image is displayed on the display screen at the obtained display magnification.

The display screen may be a display screen of an external device different from the variable-magnification image processing apparatus. In this case, the pixel number of the display screen may be obtained from the external device.

The informing unit may be configured to inhibit informing the user of the fact when the pixel number of the display screen is not obtained from the external device.

The display screen may comprise a first display screen and a second display screen different from the first display screen. The pixel number may comprise a first pixel number of the first display screen and a second pixel number of the second display screen. The display magnification obtaining unit may be configured to obtain a first display magnification defined when the image is displayed on the first display screen having the first pixel number in such a manner that pixels of the image have a one-to-one relationship with pixels of the first display screen, and to obtain a second display magnification defined when the image is displayed on the second display screen having the second pixel number in such a manner that pixels of the image have a one-to-one relationship with pixels of the second display screen. The magnification setting selection unit may be configured to execute at least one of: operation to select the obtained first display magnification subsequently to a maximum one of the magnification settings which are smaller than the obtained first display magnification and to select the obtained second display magnification subsequently to a maximum one of the magnification settings which are smaller than the obtained second display magnification when the magnifying operation for display magnification is conducted; and operation to select the obtained first display magnification subsequently to a minimum one of the magnification settings which are larger than the obtained first display magnification and to select the obtained second display magnification subsequently to a minimum one of the magnification settings which are larger than the obtained second display magnification when the reducing operation for display magnification is conducted.

The display control unit may be configured to display the image both on the first display screen and the second display screen at a same magnification setting selected by the magnification setting selection unit.

When the magnification setting selected by the magnification setting selection unit is the obtained first display magnification, the informing unit may be configured to indicate, on the first display screen, a fact that a current magnification of the image corresponds to a magnification where pixels of the image have a one-to-one relationship with pixels of the first display screen and to inhibit indicating the fact on the second display screen. When the magnification setting selected by the magnification setting selection unit is the obtained second display magnification, the informing unit may be configured to indicate, on the second display screen, a fact that a current magnification of the image corresponds to a magnification where pixels of the image have one-to-one relationship with pixels of the second display screen and to inhibit indicating the fact on the first display screen.

The informing unit may be configured to inhibit indicating the fact on the second display screen when the second pixel number is not obtained.

The magnification setting selection unit may be configured to: change the magnification setting to be selected in one of the decreasing order and the increasing order at a first predetermined time interval; and only when the magnification setting to be selected reaches the obtained display magnification obtained by the display magnification obtaining unit, perform one of following operations:

(1) switching to a next magnification setting at a second predetermined time interval longer than the first predetermined time interval, and (2) stopping switching to the next magnification setting so as to restart switching of the magnification setting at the first predetermined time interval by releasing the stopping when receiving a predetermined user operation.

The variable-magnification image processing apparatus may further comprise an image switching unit configured to switch the image displayed on the display screen In this case, each time the image being displayed is newly switched by the image switching unit, the display magnification obtaining unit may obtain the display magnification of the newly switched image whose pixels have a one-to-one relationship with pixels of the display screen. The magnification setting selection unit may be configured to execute at least one of: operation to select the obtained displaying magnification of the newly switched image subsequently to a maximum one of the magnification settings which are smaller than the obtained displaying magnification when the magnifying operation for display magnification is conducted; and operation to select the obtained displaying magnification of the newly switched image subsequently to a minimum one of the magnification settings which are larger than the obtained displaying magnification when the reducing operation for display magnification is conducted.

The display control unit may display the newly switched image on the display screen at the obtained displaying magnification selected by the magnification setting selection unit.

The magnification setting may be defined such that a magnification has a value of 1-fold in a state where the whole image is displayed on the entire display screen.

BRIEF DESCRIPTION OF THE ACCOMPANYING DRAWINGS

DETAILED DESCRIPTION OF THE EMBODIMENTS

Hereafter, explanations are given for a variable-magnification image processing apparatus according to an embodiment of the invention. Specifically, in the following, a digital single lens reflex camera is explained as the embodiment of the invention. It should be noted that an electronic device on which the variable-magnification image processing apparatus is mounted is not limited to a digital single lens reflex camera, but may be another type of electronic device capable of controlling displaying of images, such as, a mirrorless single lens camera, a compact digital camera, a camcorder, a tablet terminal, a PHS (Personal Handy Phone System), a smartphone, a feature phone, a portable game machine, a desktop PC (Personal Computer) and a note PC.

Configuration of Imaging Apparatus

Figure 1:
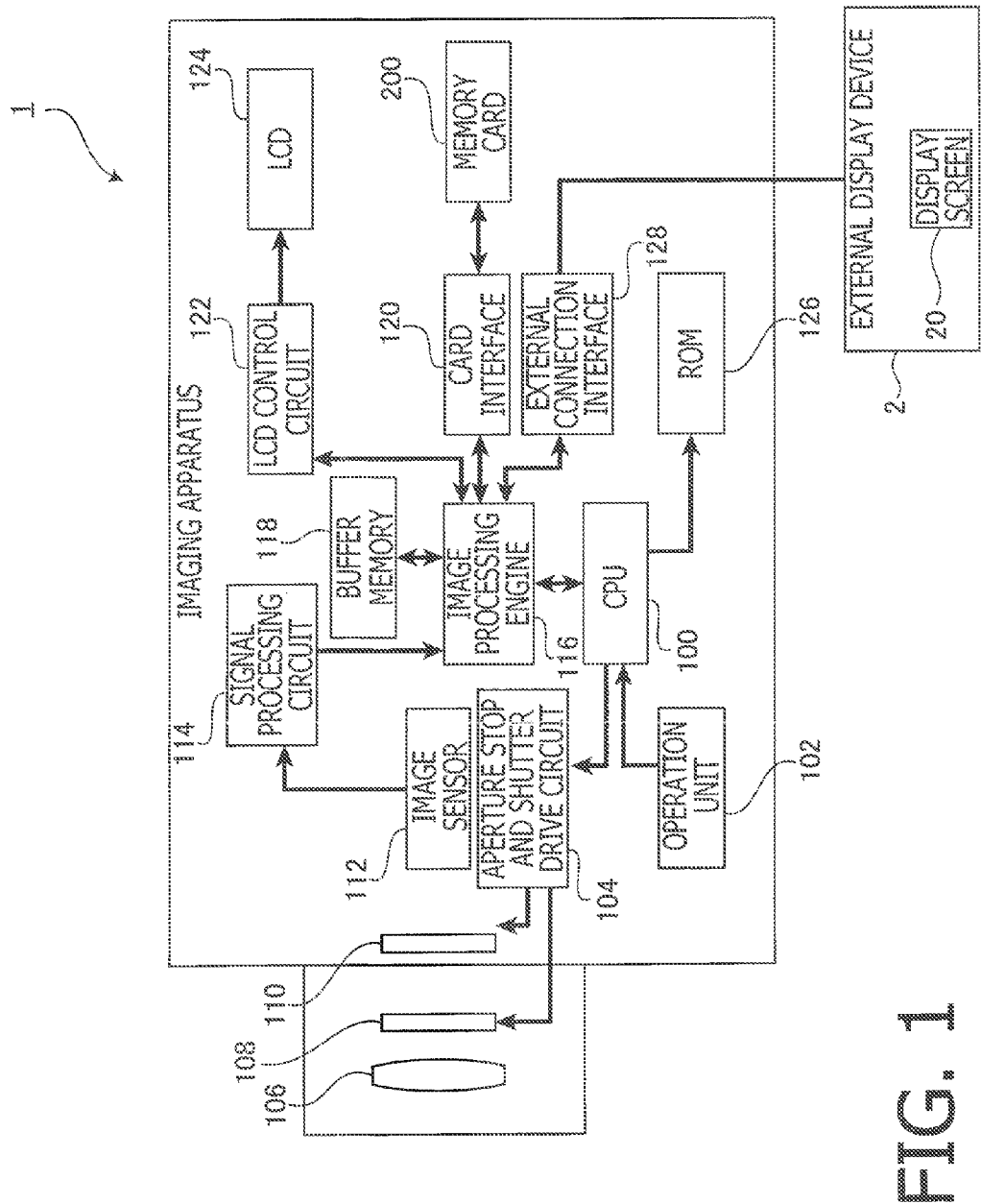
FIG. 1 is a block diagram illustrating a configuration of an imaging apparatus according to an embodiment of the invention.

FIG. 1 is a block diagram illustrating a configuration of a digital single reflex camera (hereafter, simply referred to as an "imaging apparatus") according to the embodiment. As shown in FIG. 1, the imaging apparatus 1 includes a CPU (Central Processing Unit) 100, an operation unit 102, an aperture stop and shutter drive circuit 104, an imaging lens 106, an aperture stop 108, a shutter 110, an image sensor 112, a signal processing circuit 114, an image processing engine 116, a buffer memory 118, a card interface 120, and LCD (Liquid Crystal Display) control circuit 122, a LCD 124, a ROM (Read Only Memory) 126 and an external connection interface 128.

The operation unit 102 includes various switches for operating the imaging apparatus 1, such as, a power switch, a release switch and an imaging mode switch. When the power switch is pressed by the user, power is supplied to various circuits of the imaging apparatus 1 from a battery (not shown) via a power line. After the power is supplied, the CPU 100 accesses the ROM 126 to load a control program onto a work area (not shown), and controls totally the imaging apparatus 1 by executing the control program.

When the release switch is operated, the CPU 100 drives and controls the aperture stop 108 and the shutter 110 via the aperture stop and shutter drive circuit 104 so that appropriate exposure is obtained based on a photometric value measured by a TTL (Through The Lens) metering provided in the imaging apparatus 1. More specifically, drive and control for the aperture stop 108 and the shutter 110 is executed based on the AE function designated through the imaging mode switch, such as, a program AE (Automatic Exposure), a shutter speed priority AE or an aperture priority AE. Further, the CPU 100 executes the AF (Autofocus) control together with the AE control. As the AF control, an active method, a phase difference detection method or a contrast detection method may be applied. Since these types of AE and AF functions are known, detailed explanations thereof are omitted.

A light beam from a subject is received by the image sensor 112 after passing through the imaging lens 106, the aperture stop 108 and the shutter 110. The image sensor 112 is, for example, a CCD (Charge Coupled Device) image sensor or a CMOS (Complementary Metal Oxide Semiconductor) image sensor, and is configured to accumulate charges in response to the light amount of an optical image formed on each pixel of an imaging surface thereof, to convert the accumulated charges into an electric signal, and to output the electric signal to the signal processing circuit 114. The signal processing circuit 114 executes predetermined signal processing for the electric signal (image data) inputted from the mage sensor 112, and outputs the processed signal to the image processing engine 116.

The image processing engine 116 executes predetermined signal processing, such as, color interpolation, a matrix operation and Y/C separation, generates a luminance signal Y and color difference signals Cb and Cr, and compresses the processed signal in a predetermined format, such as JPEG (Joint Photographic Experts Group). The buffer memory 118 is used as a storage space for temporarily store processing data used during execution of the processes by the image processing engine 116.

To a card slot of the card interface 120, a memory card 200 is detachably attached. The image processing engine 116 is able to communicate with the memory card 200 via the card interface 120. The image processing engine 116 stores the compressed image signal in the memory card 200 (or in an internal memory (not shown) provided in the imaging apparatus 1).

The image processing engine 116 executes predetermined signal processing for the signal which has been subjected to the Y/C separation, and buffers the processed signal in a frame memory (not shown) by the frame. The image processing engine 116 sweeps out the buffered signal from each frame memory at predetermined timings, converts the signal into a video signal in a predetermined format, and outputs the video signal to the LCD control circuit 122. The LCD control circuit 122 executes modulation control for the LCD based on the signal inputted from the image processing engine 116. As a result, an image (i.e., a picked up image) of the subject is displayed on the display screen of the LCD 124. Thus, the user is able to view a real time through image obtained at appropriate intensity and focus based on the AE control and AF control through the display screen of the LCD 124.

When a user operation for reproduction of an image is conducted, the image processing engine 116 reads out image data of the designated image from the memory card 200 or the internal memory, converts the image data into an image signal in a predetermined format, and outputs the image signal to the LCD control circuit 122.

The external connection interface 128 is an interface for connection with an external display device 2. The external display device 2 is an electronic device having a display screen 20, and is, for example, a digital single lens reflex camera, a mirrorless single lens camera, a compact digital camera, a camcorder, a tablet terminal, a PHS, a smartphone, a feature phone, a portable game machine, a desktop PC (Personal Computer), a notebook PC or a television monitor.

The external connection interface 128 is able to communicate with an external device, such as a desktop PC, through a wired connection protocol (e.g., HDMI™ (High-Definition Multimedia Interface), USB (Universal Serial Bus) or the like) or a wireless connection protocol (e.g., Wi-Fi, Bluetooth™, IrDA or the like). The image data is transferred to the external display device 2 via the external connection interface 128. The external display device 2 stores the transferred image data locally or on a URL, (Uniform resource Locator) on a network. The external display device 2 decodes the image data which has been stored locally or on a URL on a network, and displays the image obtained by the decoding on the display screen 20, for example, in accordance with a user operation.

For example, contents (e.g., a still image, a moving image or a through image) which are in synchronization with onscreen representation of the LCD 124 are displayed on the display screen 20 of the external display device 2. Let us consider a case where a user operation for reproduction of an obtained image (a still image) is conducted by the user, by way of example. In this case, the image processing engine 116 displays the image (the still image) designated by the user operation on the display screen of the LCD 124, and transfers the image (the still image) to the external display device 2 via the external connection interface 128 so as to display, on the display screen 20, the same image as the image displayed on the display screen of the LCD 124.

When the external connection interface 128 is connected with a television monitor, the external connection interface 128 outputs a component video signal of the image. Therefore, on the television monitor, contents (e.g., a still image, a moving image or a through image) which are in synchronization with onscreen representation of the LCD 124 are displayed.

It should be noted that supplemental information, such as, overlay text, may be displayed synchronously or asynchronously depending on settings set by the user through the operation unit 102 or displayed contents.

Magnification Change and Display Flow for Image

EXAMPLE 1

Figure 2:
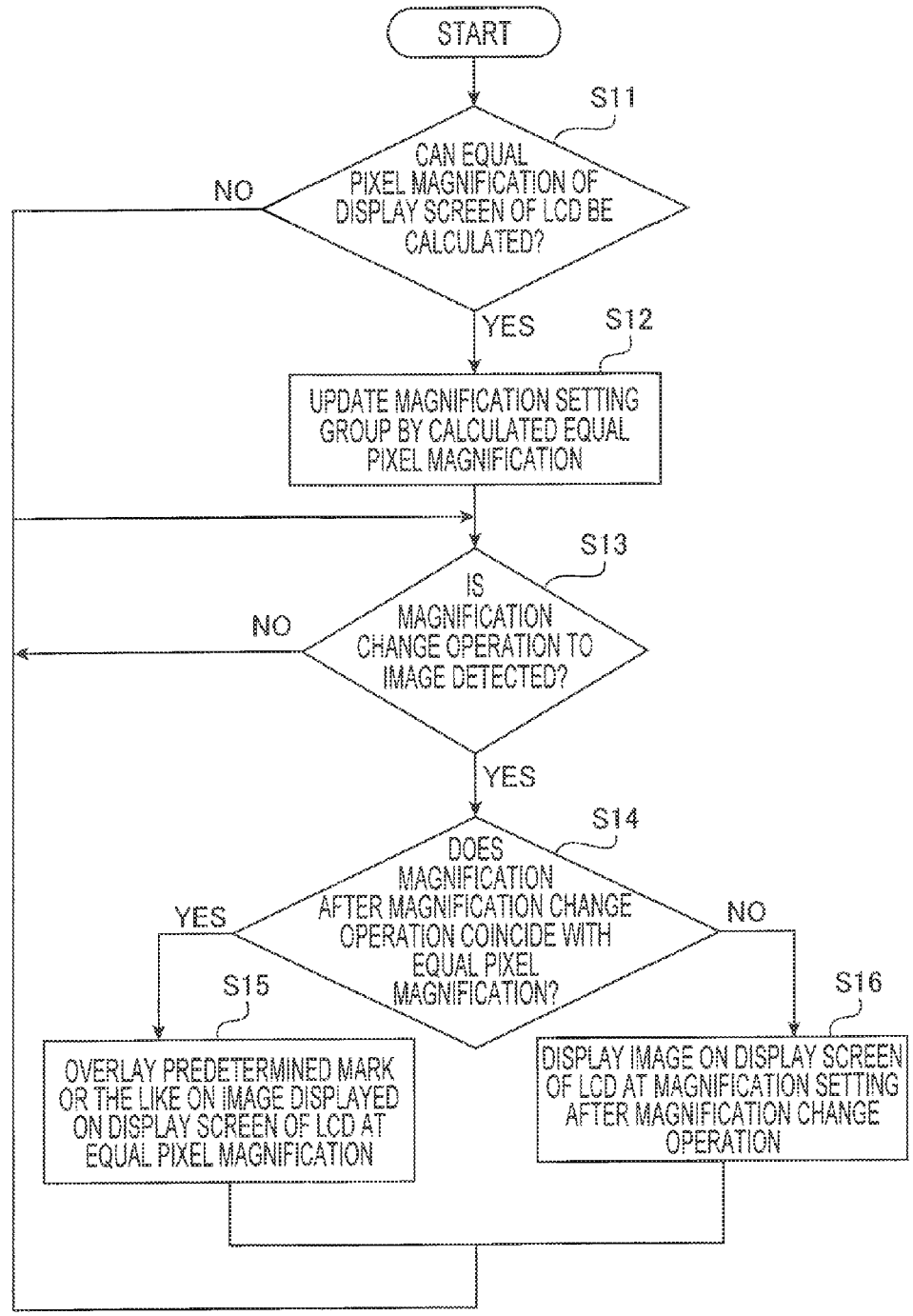
FIG. 2 is a flowchart illustrating a magnification change and display process according to example 1 of the invention.

Hereafter, a flow of a magnification change and display process for images by the imaging apparatus 1 is explained. FIG. 2 is a flowchart illustrating the magnification change and display process according to the example 1 of the invention. The magnification change and display process shown in FIG. 2 is started when an image (a still image, a moving image or a through image) is displayed on the display screen of the LCD 124, and is terminated when an image being displayed is changed to another image (another image or another through image). The magnification change and display process may be terminated when the release switch is operated.

S11 in FIG. 2 (Calculation of Magnification)

In step S11, a magnification (hereafter, referred to as an "equal pixel magnification") for displaying an image on the display screen of the LCD 124 in an equal pixel magnification display style is calculated. It is noted that the display magnification of an image is defined as one when the image is displayed in the entire displaying area of the display screen. In the example 1, the magnification when the image is displayed in the entire display screen of the LCD 124 is defined as one. The equal pixel magnification is calculated using the pixel number (vertical pixels×horizontal pixels) of an image and the pixel number (vertical pixels×horizontal pixels) of the display screen of the LCD 124.

Since the pixel number of the display screen of the LCD 124 has been stored in advance in the ROM 126 as known information, such information can be securely obtained in step S11. Further, the pixel number of a through image being displayed can be detected, for example, by checking the settings. On the other hand, the pixel number of an image stored in the memory card 200 can be obtained from a meta area, such as Exif (Exchangeable image file format). Therefore, there is a case where the pixel number cannot be obtained depending on the type of a format of an image, and therefore the equal pixel magnification cannot be calculated. In the magnification change and display process, when the equal pixel magnification can be calculated (S11: YES), the process proceeds to step S12 (update of magnification setting group). On the other hand, when the equal pixel magnification cannot be calculated (S11: NO), the process proceeds to step S13 (detection of magnification change operation to image).

S12 in FIG. 2 (Update of Magnification Setting Group)

In the ROM 126, a magnification setting group which includes two or more discrete magnification settings (e.g., 2-fold, 4-fold, 8-fold, 16-fold . . . ) defined in advance are stored. Specifically, the magnification settings are selectable in increasing order from a small value or in decreasing order from a large value are stored. The magnification setting group is read out from the ROM 126 when the image is displayed on the display screen of the LCD 124, and is stored in the buffer memory 118 until the magnification change and display process is terminated.

In step S12, the equal pixel magnification calculated in step S11 is added to the magnification setting group as one of the magnification settings. Specifically, the equal pixel magnification is selected subsequently to the magnification setting which is the maximum of the magnification settings smaller than the equal pixel magnification when a magnifying operation for the display magnification is conducted, or is selected subsequently to the magnification setting which is the minimum of the magnification settings larger than the equal pixel magnification when a reducing operation for the display magnification is conducted.

Let us consider a case where the equal pixel magnification is 6.5-fold by way of example. In this case, the equal pixel magnification is added to the magnification settings in such a manner that the magnification setting can be selected in the order of 2-fold, 4-fold, 6.5-fold, 8-fold, 16-fold, . . . , and can be selected in the order of 16-fold, 8-fold, 6.5-fold, 4-fold and 2-fold. In the updated magnification setting group, the magnification of 6.5-fold is associated with identification information indicating the equal pixel magnification.

There is a case where the equal pixel magnification is identical with an existing magnification setting as in the case where the equal pixel magnification is 4-fold. In such a case, in the magnification setting group, the existing magnification setting (4-fold) is rewritten with a new magnification setting (which is also 4-fold, but is associated with the identification information indicating the equal pixel magnification).

S13 in FIG. 2 (Detection of Magnification Change Operation to Image)

In step S13, the imaging apparatus 1 waits until a magnification change operation to an image is conducted. The display magnification of the imaging apparatus 1 can be changed, for example, by operating a dial or a lever provided in the operation unit 102 by the user. When a magnifying operation is conducted, the magnification setting is changed to a value which is one of the magnification setting group updated in step S12 in FIG. 2 and which is larger by one step than the current magnification setting (e.g., from 2-fold to 4-fold). When a reducing operation is conducted, the magnification setting is changed to one which is smaller by one step with respect to the current magnification setting (e.g., from 8-fold to -fold). When the magnification change operation is detected (S13: YES), the process proceeds to step S14.

S14 in FIG. 2 (Determination on Equal Pixel Magnification)

In step S14, it is determined whether the display magnification of the image after the magnification change operation which is detected in step S13 coincides with the equal pixel magnification. This determination step is processed based on whether the current magnification setting is associated with the identification information indicating the equal pixel magnification.

When the display magnification of the image after the magnification change operation coincides with the equal pixel magnification (S14: YES), the process proceeds to step S15 (displaying of image at equal pixel magnification). On the other hand, when the display magnification of the image after the magnification change operation does not coincide with the equal pixel magnification (S12: NO), the process proceeds to step S16.

When the imaging apparatus 1 was not able to calculate the equal pixel magnification in step S11, the determination result of step S14 is regarded as NO, and the process proceeds to step S16 (displaying of normal variable magnification image).

S15 in FIG. 2 (Displaying of Image at Equal Pixel Magnification)

In step S15, the image is displayed on the LCD 124 at the equal pixel magnification. At this time, a fact that the image is being displayed at the equal pixel magnification is informed to the user. In this case, for example, a predetermined mark or message indicating that the image is being displayed at the equal pixel magnification is overlaid on the display screen of the LCD 124, or sound indicating that the image is being displayed at the equal pixel magnification is reproduced through a speaker (not shown). Such an indication at the equal pixel magnification continues until a new operation for magnification change is detected (S13: YES), or continues until the magnification change and display process terminates.

S16 in FIG. 2 (Displaying of Normal Variable Magnification Image)

In step S16, the image is displayed on the display screen of the LCD 124 at the magnification setting after the magnification change operation. The displaying of the image at the magnification setting after the magnification change operation continues until a new magnification change operation is detected (S13: YES) or until the process of the present flowchart terminates.

Example of Screen Update

Figure 3A:
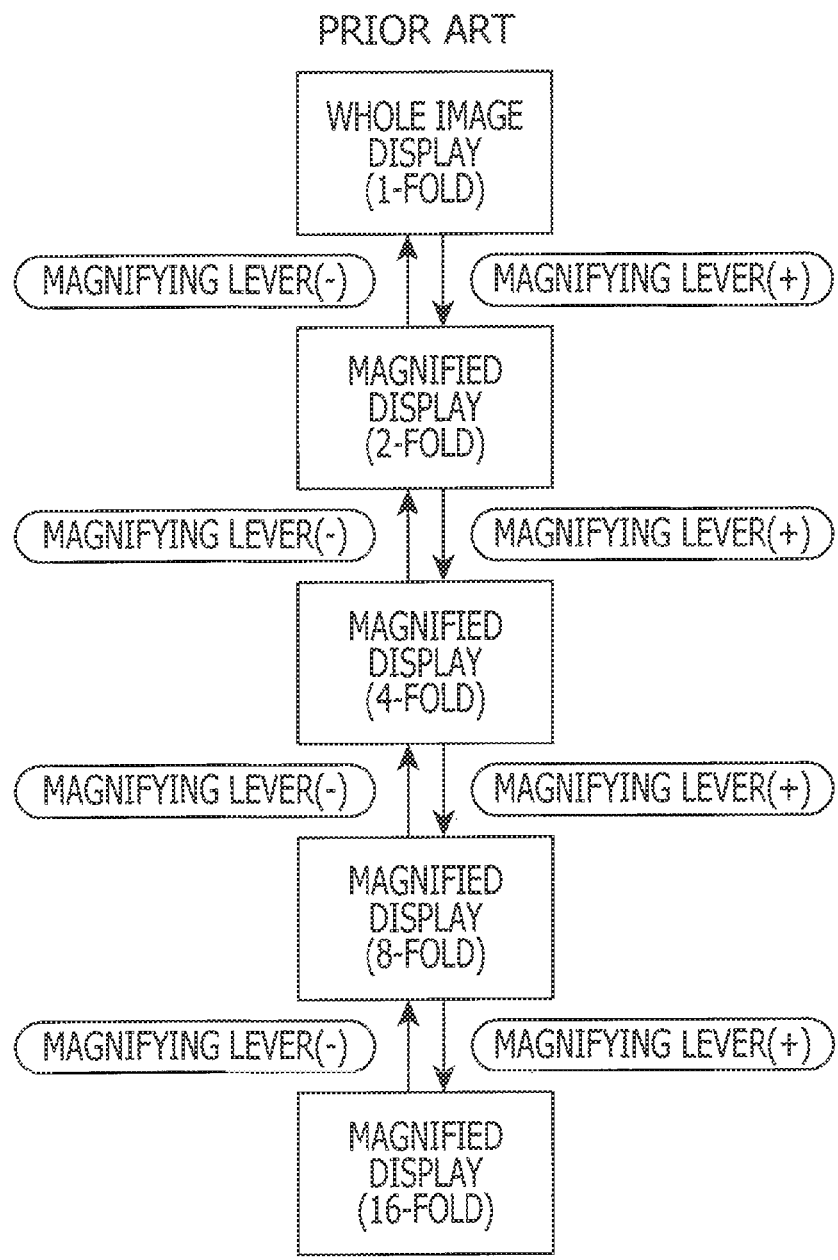
FIG. 3A illustrates an example of screen update when a magnification change operation to an image is conducted on a conventional imaging apparatus.
Figure 3B:
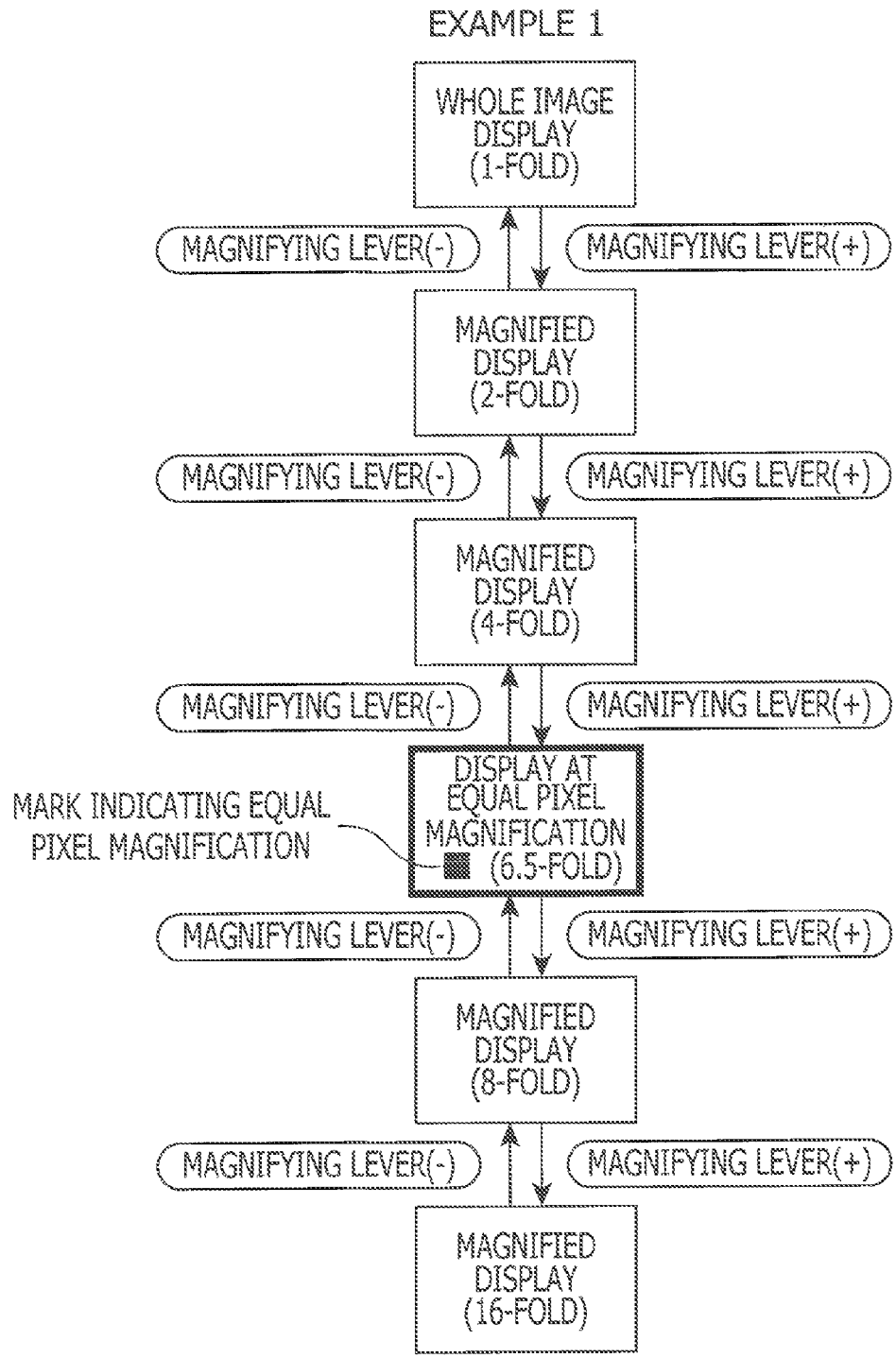
FIG. 3B illustrates an example of screen update according to the example 1 when a magnification change operation to an image is conducted.

As a comparative example, FIG. 3A illustrates an example of screen update when a magnification change operation to an image is conducted on a conventional imaging apparatus. FIG. 3B illustrates an example of screen update according to the example 1 of the embodiment executed when a magnification change operation to an image is conducted on the image apparatus 1. In the example shown in FIG. 3B, the equal pixel magnification is 6.5-fold.

According to the conventional screen update shown in FIG. 3A, each time the magnifying operation or the reducing operation for one step is conducted, the image is displayed in a magnifying manner of I-fold (whole image display)→2-fold→4-fold→8-fold→16-fold according to predefined magnification settings or is displayed in a reducing manner of 16-fold→8-fold→4-fold→2-fold→1-fold (whole image displaying).

According to the example of the screen update of the example 1 shown in FIG. 3B, the image is displayed in a magnifying manner according to the predetermined magnification settings (1-fold (whole image displaying)→2-fold→4-fold→6.5-fold→8-fold→16-fold) or in a reducing manner according to the predetermined magnification settings (16-fold→8-fold→6.5-fold→4-fold→2-fold→1-fold (whole image displaying)). When the image is displayed at the magnification of 6.5-fold, a predetermined mark or message indicating that the image is being displayed at the equal pixel magnification is overlaid on the display screen of the LCD 124.

As described above according to the example 1, the user is able to check the image of which magnification is changed for checking composition and the image displayed at the equal pixel magnification for checking a focus state without conducting a complicated user operation, while conducting the same image magnifying operation or the same image reducing operation as that of a conventional user operation. Since the conventional user operation is maintained and thereby a complicated user operation such as a switching operation for the displaying mode is not required, the operability when the user checks composition or a focus state is enhanced.

Let us consider a case where the lever provided in the operation unit 102 is pressed in the magnifying direction. In this case, the image displayed at 1-fold on the display screen of the LCD 124 is magnified in the order of 2-fold, 4-fold and 6.5-fold (the equal pixel magnification) at $1^{st}$ slight time intervals. The $1^{st}$ time interval is short enough, for example, to the extent that the user is not able to recognize the time within which the magnification of the image is switched to the next magnification setting.

When the image is magnified to the magnification of 6.5-fold (the equal pixel magnification), one of the following two operations (1) and (2) is performed.

(1) After a $2^{nd}$ time interval which is longer than the $1^{st}$ time interval is secured, the image is magnified to 8-fold. The magnifying from the magnification of 8-fold to the magnification of 16-fold is performed within the $1^{st}$ slight time interval. The $2^{nd}$ time interval is long enough to the extent that the user is able to recognize displaying of the image at the equal pixel magnification.

(2) Regardless of whether the lever is being pressed in the magnifying direction, the magnifying of the image is stopped at the equal pixel magnification. When the operation of the lever in the magnifying direction is started again, the image is magnified in the order of 8-fold to 16-fold at the $1^{st}$ slight time interval.

EXAMPLE 2

Figure 4:
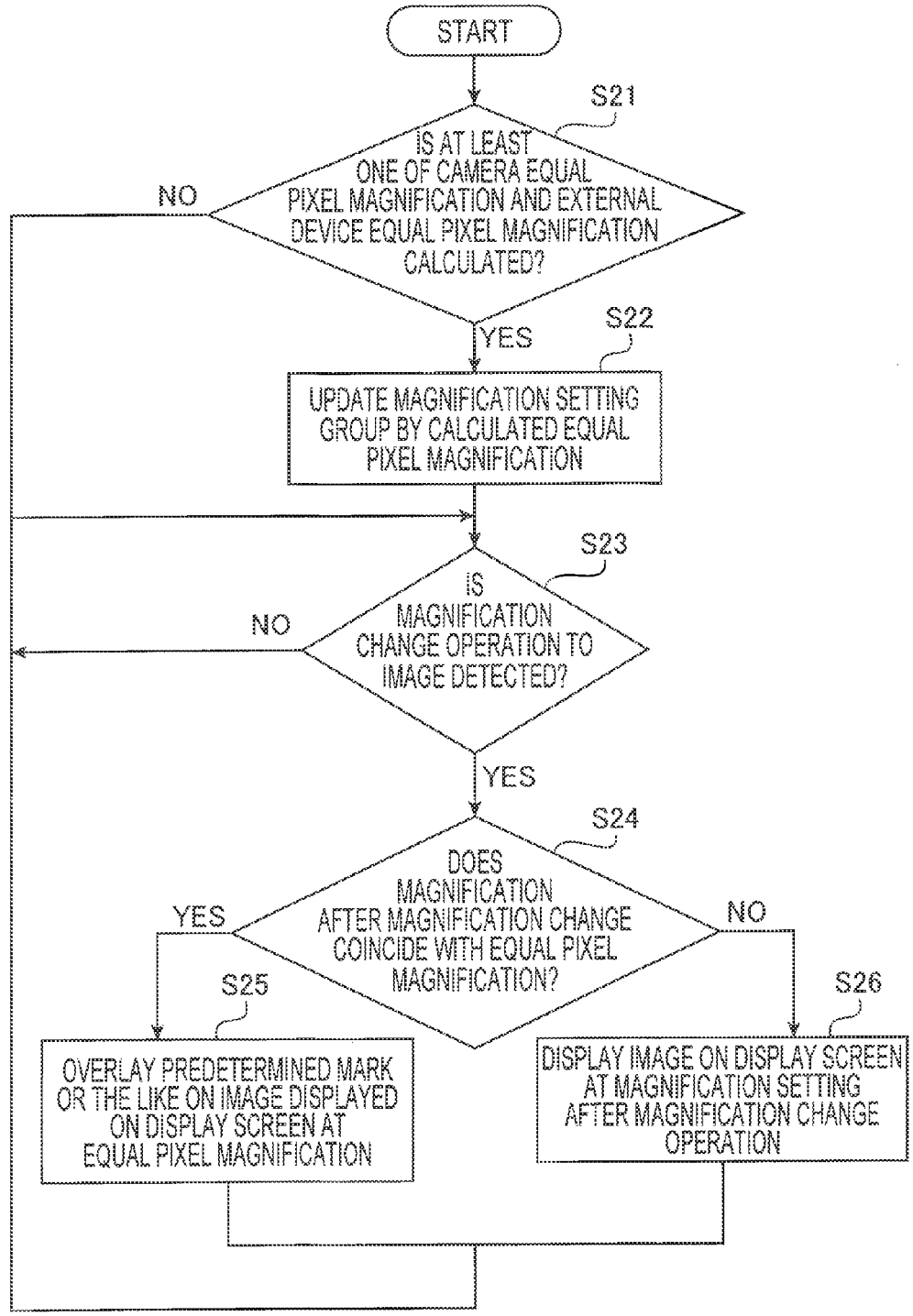
FIG. 4 is a flowchart illustrating a magnification change and display process according to example 2 of the invention.

FIG. 4 is a flowchart illustrating a magnification change and display process according to an example 2. In the example 2, the image is displayed on the display screen of the LCD 124 and the display screen 20 of the external display device 2 at the same magnification setting. The magnification change and display process shown in FIG. 4 is started when an image is displayed on the display screen of the LCD 124 and the display screen 20 of the external display device 2, and terminates when the image being displayed is changed to another image (another image or a menu screen). In the following explanation about the example 2, explanations about elements or steps which have already been explained are simplified or omitted for the sake of simplicity.

S21 in FIG. 4 (Calculation of Magnification)

In step S21, the equal pixel magnification (hereafter, referred to as a "camera equal pixel magnification") for the display screen of the LCD 124 and the equal pixel magnification (hereafter, referred to as an "external device equal pixel magnification") for the display screen 20 of the external display device 2 are calculated.

Let us consider a case where the external display device 2 is a desktop PC capable of performing HDMI communication. In this case, the imaging apparatus 1 is able to know the pixel number of the display screen 20 through communication with the external display device 2. The external display device equal pixel magnification is calculated using the pixel number of the image and the pixel number of the display screen 20 obtained from the desktop PC. Since, in the magnification change and display process shown in FIG. 4, at least the external device equal pixel magnification is calculated (S21: YES), the process proceeds to step S22 (update of magnification setting group).

Let us consider a case where the external display device 2 is a television monitor supporting a component video signal. In this case, the component video signal is transmitted only in a single direction from the imaging apparatus 1 to the television monitor. Therefore, the imaging apparatus 1 is not able to know the pixel number of the display screen 20, and is not able to calculate the external device equal pixel magnification. Accordingly, when the camera equal pixel magnification is calculated (S21: YES), the process proceeds to step S22. However, when the camera equal pixel magnification cannot be calculated either, the process proceeds to step S23 (detection of magnification change operation to image).

S22 in FIG. 4 (Update of Magnification Setting Group)

The magnification setting group has been read from the ROM 126 when the image is displayed on the display screen of the LCD 124 and the display screen 20 of the external display device 2, and is held on the buffer memory 118 until the magnification change and display process terminates.

In step S22, at least one of the equal pixel magnifications calculated in step S21 (at least one of the camera equal pixel magnification and the display device equal pixel magnification) is added to the magnification setting group as the magnification setting.

For example, the camera equal pixel magnification is added to the magnification setting group in such a manner that the camera equal pixel magnification is selected subsequently to the maximum value of the magnification settings which are smaller than the camera equal pixel magnification when the magnifying operation for the display magnification is conducted, and is selected subsequently to the minimum value of the magnification settings which are larger than the camera equal pixel magnification when the reducing operation for the display magnification is conducted.

The external device equal pixel magnification is added to the magnification setting group in such a manner that the external device equal pixel magnification is selected subsequently to the maximum value of the magnification settings which are smaller than the external device equal pixel magnification when the magnifying operation for the display magnification is conducted, and is selected subsequently to the minimum value of the magnification settings which are larger than the external device equal pixel magnification when the reducing operation for the display magnification is conducted.

Let us consider a case where the camera equal pixel magnification and the external device equal pixel magnification are 6.5-fold and 2.8-fold, respectively, by way of example. In this case, the camera equal pixel magnification and the external device equal pixel magnification are added to the magnification setting group such that the magnification setting is selected in the order of 2-fold, 2.8-fold, 4-fold, 6.5-fold, 8-fold, 16-fold . . . and the order of . . . 16-fold, 8-fold, 6.5-fold, 4-fold, 2.8-fold and 2-fold.

S23 in FIG. 4 (Detection of Magnification Change Operation to Image)

In step S23, the imaging apparatus 1 waits for the magnification change operation to the image. In the magnification change and display process shown in FIG. 4, when the magnification change operation is detected (S23: YES), the process proceeds to step S24.

S24 in FIG. 4 (Determination on Equal Pixel Magnification)

In step S24, the imaging apparatus 1 determines whether the display magnification of the image after detection of the magnification change operation in step S23 coincides with the equal pixel magnification (at least one of the camera equal pixel magnification and the external device equal pixel magnification).

When the display magnification of the image after the magnification change operation coincides with the equal pixel magnification (at least one of the camera equal pixel magnification and the external device equal pixel magnification) (S24: YES), the process proceeds to step S25 (displaying of image at equal pixel magnification). When the displaying magnification does not coincide with the equal pixel magnification (at least one of the camera equal pixel magnification and the external device equal pixel magnification) (S24: NO), the process proceeds to step S26 (displaying of normal variable magnification image).

When one of the camera equal pixel magnification and the external device equal pixel magnification is calculated in step S21, the determination result of step S24 is regarded as NO, and the process proceeds to step S26.

S25 in FIG. 4 (Displaying of Image at Equal Pixel Magnification)

In step S25, the image is displayed on the display screen at the equal pixel magnification. At this time, the fact that the image is being displayed at the equal pixel magnification is informed to the user.

Regarding the camera equal pixel magnification, for example, a predetermined mark or message indicating that the image is being displayed at the equal pixel magnification is overlaid on the display screen of the LCD 124. On the other hand, in this case the image is not displayed at the equal pixel magnification on the external display device 2. Therefore, on the display screen 20, the above described mark or message is not overlaid.

Regarding the external device equal pixel magnification, for example, a predetermined mark or message indicating that the image is being displayed at the equal pixel magnification is overlaid on the display screen 20 of the external display device 2. On the other hand, in this case the image is not displayed at the equal pixel magnification on the LCD 124 of the imaging apparatus 1. Therefore, the above described mark or message is not overlaid on the display screen of the LCD 124.

It should be noted that, in place of the above described mark or message, sound corresponding to the above described mark or message may be reproduced.

The displaying at the equal pixel magnification continues until a new magnification change operation is detected or until the magnification change and display process terminates.

S26 in FIG. 4 (Displaying of Normal Variable Magnification Image)

In step S26, the image is displayed on the display screen of the LCD 124 and the display screen 20 of the external display device 2 at the magnification setting after the magnification change operation. Displaying of the image at the magnification setting after the magnification change operation continues until a new magnification change operation is detected (S23: YES) or the magnification change and display process shown in FIG. 4 terminates.

Example of Screen Update

Figure 5A:
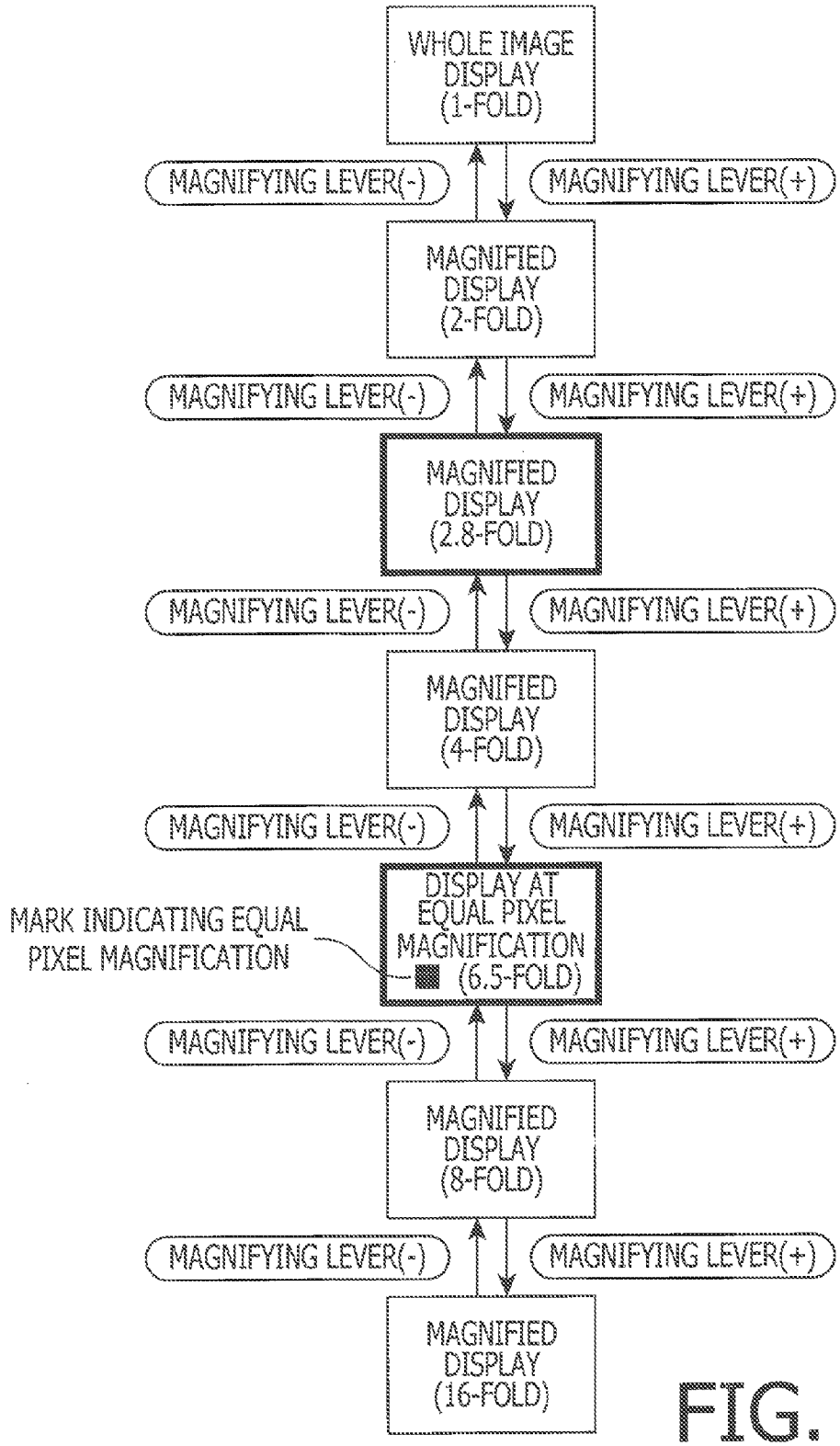
FIGS. 5A and 5B illustrate an example of screen update according to the example 2 when a magnification change operation to an image is conducted.
Figure 5B:
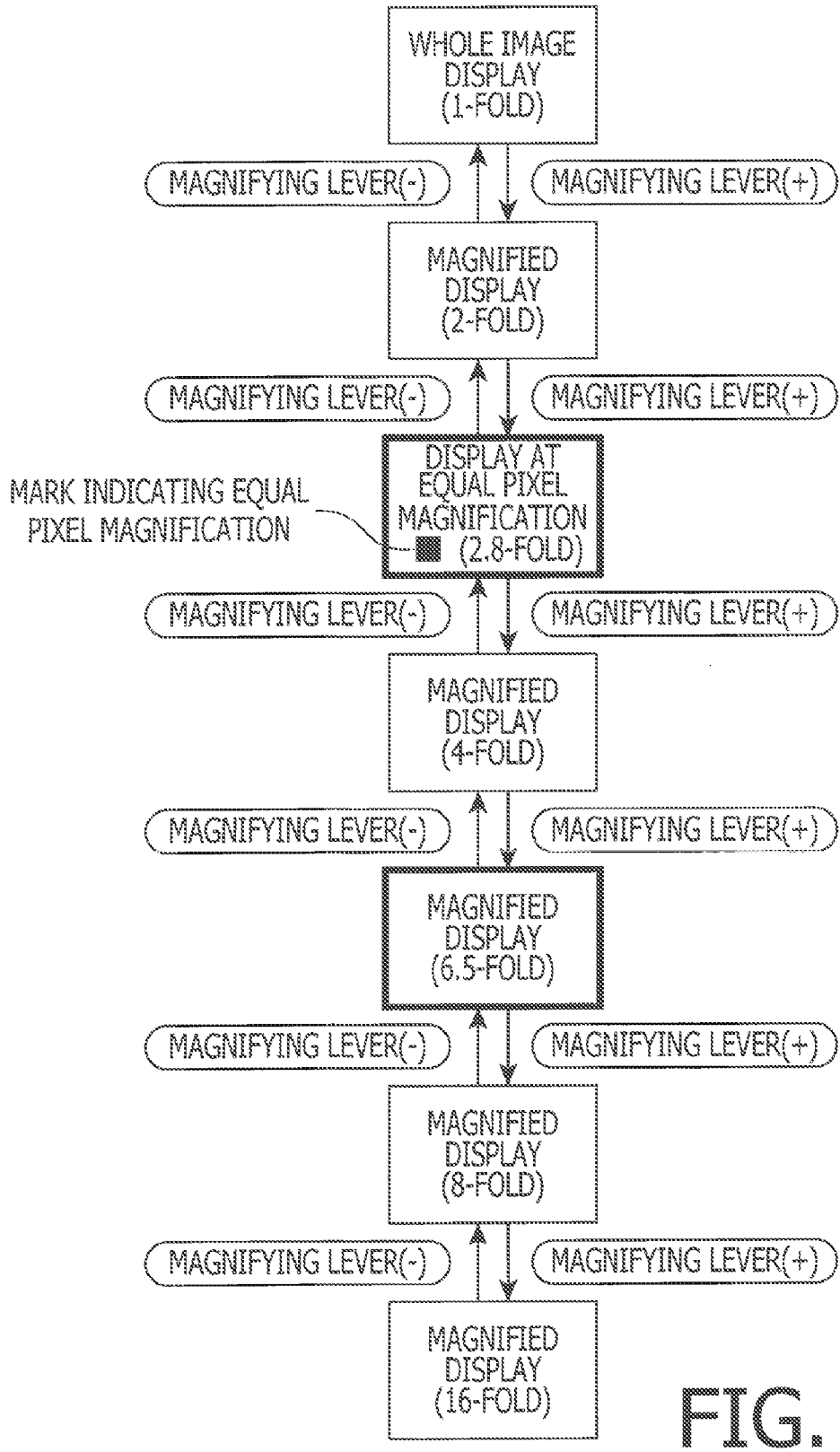
Figures 6A, 6B, 6C, 6D:
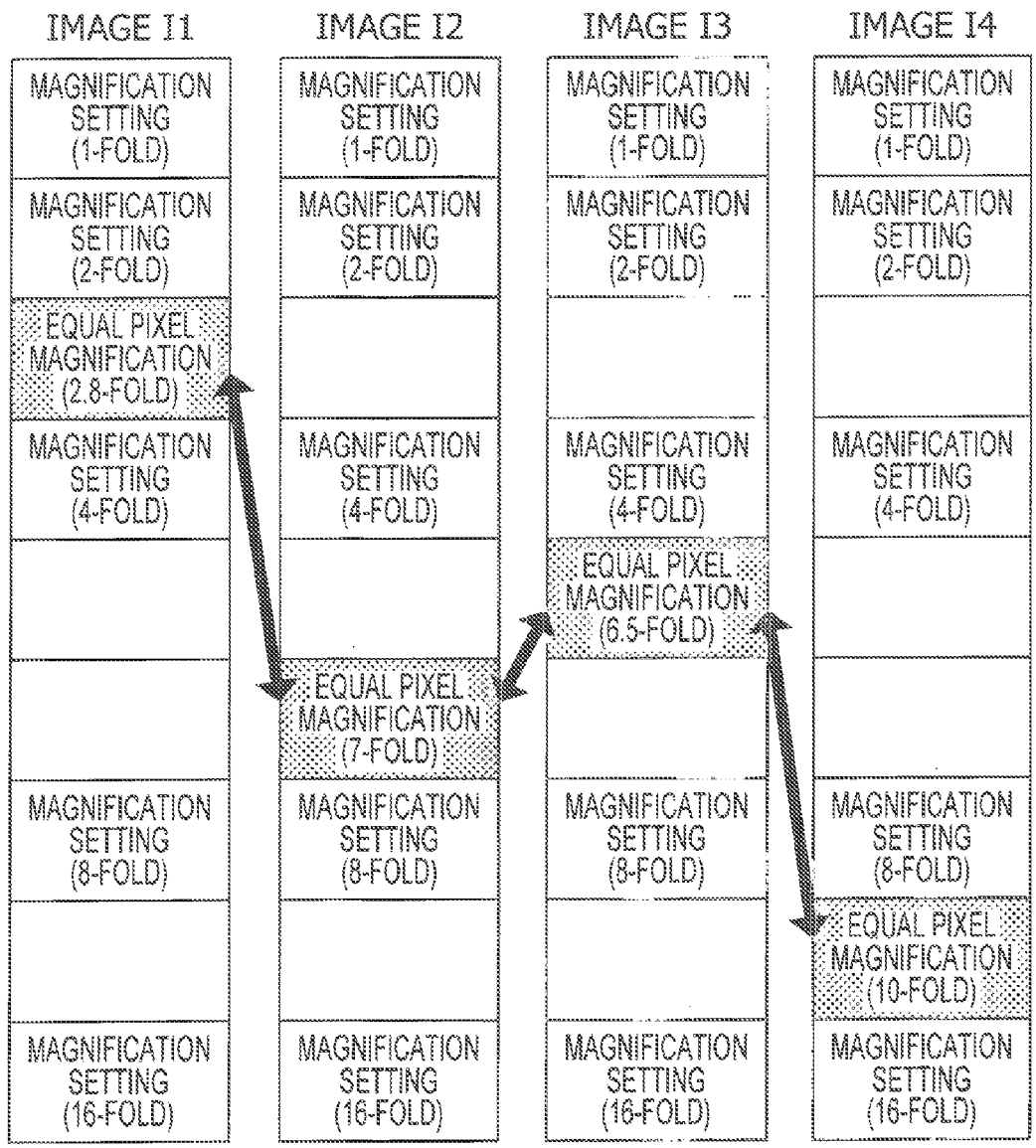
FIGS. 6A to 6D illustrate magnification setting groups used to display images obtained at respective pixel numbers in example 3 of the invention.

FIG. 5A illustrates an example of screen update executed when the magnification change operation to an image is conducted on the imaging apparatus 1 according to the example 2. FIG. 5B illustrates an example of screen update on the external display device 2 executed when the magnification change operation to an image is conducted according to the example 2. In each of FIGS. 5A and 5B, the camera equal pixel magnification and the external device equal pixel magnification are 6.5-fold and 2.8-fold, respectively.

In the examples of screen update shown in FIGS. 5A and 5B, the image is magnified in accordance with the magnification settings (1-fold (whole image display)→2-fold→2.8-fold→4-fold→6.5-fold→8-fold→16-fold) of the magnification setting group updated in step S22 of FIG. 4 each time the magnifying operation for one step is conducted, and the image is reduced in accordance with the magnification settings (16-fold→8-fold→6.5-fold→4-fold→2.8-fold→2-fold→1-fold (whole image display)) of the magnification setting group updated in step S22 of FIG. 4 each time the reducing operation for one step is conducted. When the image is displayed at the magnification setting of 2.8-fold, a predetermined mark or message indicating that the image is being displayed at the external device equal pixel magnification is overlaid only on the display screen 20 of the external display device 2. When the image is being displayed at the magnification setting of 6.5-fold, a predetermined mark or message indicating that the image is being displayed at the camera equal pixel magnification is overlaid only on the display screen of the LCD 124.

As described above, according to the example 2, the user is able to check the image of which magnification is changed for checking composition and the image displayed at the equal pixel magnification for checking a focus state, without conducting a complicated user operation, during the image magnifying operation or the image reducing operation which is the same as that of a conventional user operation.

EXAMPLE 3

The pixel number of an image (vertical pixel×horizontal pixel) can be changed in accordance with a user operation to the operation unit 102. In the third example, explanations are given hereafter on the assumption that images respectively obtained at the set pixel numbers have been stored in the memory card 200.

FIGS. 6A to 6D illustrate the magnification setting groups used to display the images obtained at the respective pixel numbers in the example 3. That is, FIGS. 6A to 6D show the magnification setting groups of the four images I1 to I4 obtained at the different pixel numbers. In the example 3, only the case where the image is displayed on the LCD 124 is explained for convenience of explanations.

Let us consider a case where, in the example 3, onscreen representation of the display screen of the LCD 124 is changed in the order of the images I1, I2 I3 and I4 in accordance with an image selection operation conducted by the user on the operation unit 102. In this case, each time the image selection operation is conducted, the camera equal pixel magnification is calculated for the image selected through the user operation, and is added to the magnification setting group. Next, the calculated camera equal pixel magnification is selected, and the image is displayed on the display screen of the LCD 124 at the selected camera equal pixel magnification. That is, on the display screen of the LCD 124, the selected image is displayed at the camera equal pixel magnification. When the magnifying operation is conducted without changing the image, the image is displayed at the magnification setting after the magnification change operation as in the case of the example 1 and the example 2.

As shown in FIGS. 6A to 6D, the camera equal pixel magnifications of the images I1, I2, I3 and I4 are 2.8-fold, 7-fold, 6.5-fold and 10-fold, respectively. Therefore, on the display screen of the LCD 124, the image I1 at the display magnification of 2.8-fold, the image I2 at the display magnification of 7-fold, the image I3 at the display magnification of 5-fold and the image I4 at the display magnification of 10-fold are displayed in this order.

The camera equal pixel magnification may be calculated in advance when the image is shot and may be associated with the image. In this case, it becomes unnecessary to calculate the camera equal pixel magnification one after another each time the image selection operation is conducted.

The example 3 is advantageous particularly when the user wants to quickly check the focus state of a plurality of images.

The foregoing is the explanation about the embodiment of the invention. The invention is not limited to the above described embodiment, but can be varied in various ways within the scope of the invention. For example, the invention includes a combination of embodiments explicitly described in this specification and embodiments easily realized from the above described embodiment.

This application claims priority of Japanese Patent Application No. P2013-206832, filed on Oct. 1, 2013. The entire subject matter of the application is incorporated herein by reference.

What is claimed is:

1. A variable-magnification image processing apparatus, comprising:
   a magnification setting group storing unit configured to store a magnification setting group including two or more predetermined discrete magnification settings, the magnification setting group being defined such that the magnification settings are selectable in one of decreasing order and increasing order;
   a display magnification obtaining unit configured to obtain a display magnification of an image defined when the image is displayed on a display screen having a predetermined pixel number in such a manner that pixels of the image have a one-to-one relationship with pixels of the display screen;
   a magnification setting selection unit configured to select one of the magnification settings in the magnification setting group in one of decreasing order and increasing order in accordance with a predetermined user operation; and
   a display control unit configured to display the image on the display screen at the magnification setting selected by the magnification setting selection unit,
   wherein the magnification setting selection unit is configured to execute at least one of:
   operation to select the obtained display magnification obtained by the display magnification obtaining unit subsequently to a maximum one of the magnification settings which are smaller than the obtained display magnification when a magnifying operation for display magnification is conducted; and
   operation to select the obtained displaying magnification subsequently to a minimum one of the magnification settings which are larger than the obtained display magnification when a reducing operation for display magnification is conducted.

2. The variable-magnification image processing apparatus according to claim 1,
   further comprising an informing unit configured to inform a user of a fact that a current magnification of the image corresponds to a magnification where pixels of the image have the one-to-one relationship with pixels of the display screen when the image is displayed on the display screen at the obtained display magnification.

3. The variable-magnification image processing apparatus according to claim 2,
   wherein:
   the display screen is a display screen of an external device different from the variable-magnification image processing apparatus; and
   the pixel number of the display screen is obtained from the external device.

4. The variable-magnification image processing apparatus according to claim 3,
   wherein the informing unit is configured to inhibit informing the user of the fact when the pixel number of the display screen is not obtained from the external device.

5. The variable-magnification image processing apparatus according to claim 2,
   wherein:
   the display screen comprises a first display screen and a second display screen different from the first display screen;
   the pixel number comprises a first pixel number of the first display screen and a second pixel number of the second display screen;
   the display magnification obtaining unit is configured to obtain a first display magnification defined when the image is displayed on the first display screen having the first pixel number in such a manner that pixels of the image have a one-to-one relationship with pixels of the first display screen, and to obtain a second display magnification defined when the image is displayed on the second display screen having the second pixel number in such a manner that pixels of the image have a one-to-one relationship with pixels of the second display screen; and
   the magnification setting selection unit is configured to execute at least one of:
   operation to select the obtained first display magnification subsequently to a maximum one of the magnification settings which are smaller than the obtained first display magnification and to select the obtained second display magnification subsequently to a maximum one of the magnification settings which are smaller than the obtained second display magnification when the magnifying operation for display magnification is conducted; and
   operation to select the obtained first display magnification subsequently to a minimum one of the magnification settings which are larger than the obtained first display magnification and to select the obtained second display magnification subsequently to a minimum one of the magnification settings which are larger than the obtained second display magnification when the reducing operation for display magnification is conducted.

6. The variable-magnification image processing apparatus according to claim 5,
   wherein the display control unit is configured to display the image both on the first display screen and the second display screen at a same magnification setting selected by the magnification setting selection unit.

7. The variable-magnification image processing apparatus according to claim 6,
wherein:
when the magnification setting selected by the magnification setting selection unit is the obtained first display magnification, the informing unit is configured to indicate, on the first display screen, a fact that a current magnification of the image corresponds to a magnification where pixels of the image have a one-to-one relationship with pixels of the first display screen and to inhibit indicating the fact on the second display screen; and
when the magnification setting selected by the magnification setting selection unit is the obtained second display magnification, the informing unit is configured to indicate, on the second display screen, a fact that a current magnification of the image corresponds to a magnification where pixels of the image have one-to-one relationship with pixels of the second display screen and to inhibit indicating the fact on the first display screen.

8. The variable-magnification image processing apparatus according to claim 5,
wherein the informing unit is configured to inhibit indicating the fact on the second display screen when the second pixel number is not obtained.

9. The variable-magnification image processing apparatus according to claim 1,
wherein the magnification setting selection unit is configured to:
change the magnification setting to be selected in one of the decreasing order and the increasing order at a first predetermined time interval; and
only when the magnification setting to be selected reaches the obtained display magnification obtained by the display magnification obtaining unit, perform one of following operations:
(1) switching to a next magnification setting at a second predetermined time interval longer than the first predetermined time interval, and
(2) stopping switching to the next magnification setting so as to restart switching of the magnification setting at the first predetermined time interval by releasing the stopping when receiving a predetermined user operation.

10. The variable-magnification image processing apparatus according to claim 1,
further comprising an image switching unit configured to switch the image displayed on the display screen,
wherein:
each time the image being displayed is newly switched by the image switching unit, the display magnification obtaining unit obtains the display magnification of the newly switched image whose pixels have a one-to-one relationship with pixels of the display screen; and
the magnification setting selection unit is configured to execute at least one of:
operation to select the obtained displaying magnification of the newly switched image subsequently to a maximum one of the magnification settings which are smaller than the obtained displaying magnification when the magnifying operation for display magnification is conducted; and
operation to select the obtained displaying magnification of the newly switched image subsequently to a minimum one of the magnification settings which are larger than the obtained displaying magnification when the reducing operation for display magnification is conducted.

11. The variable-magnification image processing apparatus according to claim 10,
wherein the display control unit displays the newly switched image on the display screen at the obtained displaying magnification selected by the magnification setting selection unit.

12. The variable-magnification image processing apparatus according to claim 1,
wherein the magnification setting is defined such that a magnification has a value of 1-fold in a state where the whole image is displayed on the entire display screen.

13. The variable-magnification image processing apparatus according to claim 1,
wherein:
the display screen is a display screen of an external device different from the variable-magnification image processing apparatus; and
the pixel number of the display screen is obtained from the external device.

14. The variable-magnification image processing apparatus according to claim 1,
wherein:
the display screen comprises a first display screen and a second display screen different from the first display screen;
the pixel number comprises a first pixel number of the first display screen and a second pixel number of the second display screen;
the display magnification obtaining unit is configured to obtain a first display magnification defined when the image is displayed on the first display screen having the first pixel number in such a manner that pixels of the image have a one-to-one relationship with pixels of the first display screen, and to obtain a second display magnification defined when the image is displayed on the second display screen having the second pixel number in such a manner that pixels of the image have a one-to-one relationship with pixels of the second display screen; and
the magnification setting selection unit is configured to execute at least one of:
operation to select the obtained first display magnification subsequently to a maximum one of the magnification settings which are smaller than the obtained first display magnification and to select the obtained second display magnification subsequently to a maximum one of the magnification settings which are smaller than the obtained second display magnification when the magnifying operation for display magnification is conducted; and
operation to select the obtained first display magnification subsequently to a minimum one of the magnification settings which are larger than the obtained first display magnification and to select the obtained second display magnification subsequently to a minimum one of the magnification settings which are larger than the obtained second display magnification when the reducing operation for display magnification is conducted.

* * * * *